US011915555B2

(12) United States Patent
Sensui et al.

(10) Patent No.: US 11,915,555 B2
(45) Date of Patent: *Feb. 27, 2024

(54) INFORMATION PROCESSING SYSTEM, INFORMATION PROCESSING METHOD, COMPUTER-READABLE NON-TRANSITORY STORAGE MEDIUM HAVING STORED THEREIN INFORMATION PROCESSING PROGRAM, AND INFORMATION PROCESSING APPARATUS

(71) Applicants: NINTENDO CO., LTD., Kyoto (JP); DeNA Co., Ltd., Tokyo (JP)

(72) Inventors: Kazuyoshi Sensui, Kyoto (JP); Masaki Yasuhara, Kyoto (JP); Ai Takeuchi, Tokyo (JP)

(73) Assignees: NINTENDO CO., LTD., Kyoto (JP); DeNA Co., Ltd., Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 17/510,548

(22) Filed: Oct. 26, 2021

(65) Prior Publication Data
US 2022/0044523 A1   Feb. 10, 2022

Related U.S. Application Data

(63) Continuation of application No. 16/210,276, filed on Dec. 5, 2018, now Pat. No. 11,183,014.

(30) Foreign Application Priority Data

Apr. 9, 2018  (JP) ................................ 2018-074805

(51) Int. Cl.
*G07F 17/32*  (2006.01)
*A63F 13/69*  (2014.01)
(Continued)

(52) U.S. Cl.
CPC .......... *G07F 17/3244* (2013.01); *A63F 13/69* (2014.09); *A63F 13/822* (2014.09);
(Continued)

(58) Field of Classification Search
CPC ............. G07F 17/3244; G07F 17/3262; G07F 17/329; A63F 13/69; A63F 13/822; G06Q 50/34
See application file for complete search history.

(56) References Cited

U.S. PATENT DOCUMENTS 7,993,191 B2 * 8/2011 Evans ................. G07F 17/3293
                                                        273/138.2
9,737,819 B2 * 8/2017 Desanti ................. A63F 13/822
(Continued)

FOREIGN PATENT DOCUMENTS

JP      2013-223640    10/2013
JP      2014/239768    12/2014
(Continued)

*Primary Examiner* — Seng H Lim
(74) *Attorney, Agent, or Firm* — Nixon & Vanderhye P.C.

(57) ABSTRACT

A first lottery section performs a first lottery for specifying at least one presentation element among a plurality of presentation elements respectively associated with a plurality of content groups. A presentation section presents the presentation element specified by the first lottery, to a user. A second lottery section performs, in accordance with a user's instruction, a second lottery for specifying at least one content from the content group associated with the presentation element presented by the presentation section. A providing section provides the content drawn by the second lottery, to the user.

22 Claims, 9 Drawing Sheets

(51) Int. Cl.
*A63F 13/822* (2014.01)
*G06Q 50/34* (2012.01)
(52) U.S. Cl.
CPC ......... *G06Q 50/34* (2013.01); *G07F 17/3262* (2013.01); *G07F 17/329* (2013.01)

(56) References Cited

U.S. PATENT DOCUMENTS

| | | | |
|---|---|---|---|
| 2014/0364194 A1 | 12/2014 | Kusano et al. | |
| 2015/0031440 A1* | 1/2015 | Desanti | A63F 13/822 463/25 |

FOREIGN PATENT DOCUMENTS

| | | |
|---|---|---|
| JP | 2016-154794 | 9/2016 |
| JP | 2017-221340 | 12/2017 |
| JP | 2018-000493 | 1/2018 |
| JP | 6918737 | 7/2021 |
| WO | 2013/161456 | 10/2013 |

* cited by examiner

| FURNITURE ID (521) | FURNITURE DETAIL DATA (522) | RARENESS DEGREE (523) |
|---|---|---|
| 0100 | .... | .... |
| 0101 | .... | .... |
| 0102 | .... | .... |
| ⋮ | ⋮ | ⋮ |

| COOKIE ID (531) | RARENESS DEGREE (533) | LOTTERY TARGET DATA (534) |
|---|---|---|
| 0100 | .... | .... |
| 0101 | .... | .... |
| 0102 | .... | .... |
| 0103 | .... | .... |
| ⋮ | ⋮ | ⋮ |

| FURNITURE ID (535) | APPEARANCE RATE (536) |
|---|---|
| 0100 | n.nnn% |
| 0101 | n.nnn% |
| 0102 | n.nnn% |
| ⋮ | ⋮ |

| COOKIE ID | APPEARANCE RATE |
|---|---|
| 0100 | n.nnn% |
| 0101 | n.nnn% |
| 0102 | n.nnn% |
| 0103 | n.nnn% |
| ⋮ | ⋮ |

| RARENESS DEGREE | APPEARANCE RATE |
|---|---|
| SS | nn.n% |
| S | nn.n% |
| R | nn.n% |
| N | nn.n% |

| FRAME NUMBER | COOKIE ID | SOLD-OUT FLAG |
|---|---|---|
| 1 | 0100 | OFF |
| 2 | 0101 | OFF |
| 3 | 0102 | OFF |

INFORMATION PROCESSING SYSTEM, INFORMATION PROCESSING METHOD, COMPUTER-READABLE NON-TRANSITORY STORAGE MEDIUM HAVING STORED THEREIN INFORMATION PROCESSING PROGRAM, AND INFORMATION PROCESSING APPARATUS

CROSS REFERENCE TO RELATED APPLICATION

This application is a continuation of U.S. patent application Ser. No. 16/210,276, filed Dec. 5, 2018, now allowed; which claims priority to Japanese Patent Application No. 2018-074805, filed on Apr. 9, 2018; the entire contents of each being incorporated herein by reference.

FIELD

The exemplary embodiments relate to an information process for giving content used in a predetermined application, to a user by lottery.

BACKGROUND AND SUMMARY

Conventionally, there is known a system that provides a lottery game for lottery target content by spending virtual currency or the like that a user has.

In the lottery in the system as described above, the lottery target content is merely determined by an administrator. That is, how to determine the lottery target content is up to only the administrator's setting. In this regard, there is a room for improving amusement of lottery in terms of the way of determining the lottery target content as described above.

Therefore, an object of the exemplary embodiments is to provide an information processing system, an information processing method, a computer-readable non-transitory storage medium having stored therein information processing program, and an information processing apparatus that enable further improvement in amusement of lottery.

Configuration examples for achieving the above object will be shown below.

One configuration example is an information processing system including at least one computer, the at least one computer executing: performing a first lottery for specifying at least one presentation element among a plurality of presentation elements respectively associated with a plurality of content groups; presenting the presentation element specified by the first lottery; performing, in accordance with a user's instruction, a second lottery for specifying at least one content from the content group associated with the presented presentation element; and providing the content specified by the second lottery, to the user.

According to the above configuration example, regarding the presentation elements each associated with a plurality of contents, which presentation element is to be presented is further determined by lottery. Thus, it is possible to improve amusement in providing content to the user by lottery.

In another configuration example, the first lottery may be automatically at a predetermined timing.

According to the above configuration example, a lottery for the presentation elements can be automatically performed at a predetermined timing. Therefore, even if the presented element determined by one lottery is not an element that the user desires, an occasion of a lottery for the presentation elements can be given to the user again. Thus, amusement of lottery can be improved.

In another configuration example, even if the user's instruction is not performed after the first lottery has been performed at a last time, the first lottery may be performed when the predetermined timing comes.

According to the above configuration example, the first lottery can be executed irrespective of whether or not the second lottery has been performed on the basis of a user's instruction. Therefore, even if the presentation element presented as a result of the first lottery is not an element that the user desires, the user can obtain an occasion of the first lottery again by waiting for a predetermined timing. Thus, amusement of lottery can be improved.

In another configuration example, the first lottery may be performed every time the predetermined timing comes.

According to the above configuration example, the first lottery can be repeatedly executed, whereby the presentation elements can be exchanged at regular intervals. Thus, it is possible to provide the user with a motivation for activating a predetermined application. For example, the presentation elements can be changed on a daily basis. In such a case, the user can be provided with amusement of what lottery target will be presented. Thus, it is possible to provide the user with a motivation for activating a predetermined application.

In another configuration example, the second lottery may be performed when first virtual currency associated with the user is spent in accordance with a user's instruction.

According to the above configuration example, for example, the user can perform the second lottery based on the presentation element, using in-game currency. Thus, it is possible to provide a motivation for accumulating the first virtual currency in the game.

In another configuration example, the presentation element specified by the first lottery may be presented to the user irrespective of whether or not the first virtual currency is spent.

According to the above configuration example, regarding the presentation element specified by the first lottery, it becomes possible to exchange the presentation element irrespective of whether or not the virtual currency is spent. Thus, amusement in providing content to the user by lottery can be improved.

In another configuration example, a first presentation element specified by the first lottery, and a second presentation element which is set in advance irrespective of the first lottery, are presented to the user. When the first virtual currency is spent in accordance with a user's instruction, the second lottery for specifying at least one content from the content group associated with the first presentation element may be performed, and when a second virtual currency different from the first virtual currency is spent, the second lottery for specifying at least one content from the content group associated with the second presentation element may be performed.

According to the above configuration example, the user is allowed to perform a lottery based on a content group associated with the second presentation element by using the second virtual currency. Therefore, while the user enjoys a lottery for the presentation elements, even if the presentation element that the user desires has not been drawn by a lottery, the user is allowed to perform a lottery for a content group associated with the presentation element that the user desires, by using the second virtual currency. Thus, it is possible to realize such lottery that satisfies the user's desire while keeping amusement of lottery.

In another configuration example, the at least one computer may further execute providing a reward to the user when the second lottery is performed.

According to the above configuration example, it is possible to provide a predetermined reward to the user when using the second virtual currency. Thus, a motivation for using the second virtual currency can be provided. For example, it is also possible that a predetermined number of points are given, and if the number of points reaches a predetermined value or higher, the user is allowed to designate a presentation element or the like that the user desires, and is provided with the same. Thus, a motivation for using the second virtual currency can be provided.

In another configuration example, the at least one computer may further execute providing the first virtual currency to the user in exchange for the content.

According to the above configuration example, the user can perform again the second lottery for specifying at least one content from the content group associated with the first presentation element, by using the first virtual currency provided in exchange for the acquired content, whereby amusement of lottery can be improved. For example, even if the user has failed to acquire the content that the user desires as a result of a lottery, the user can acquire the first virtual currency by selling the content acquired by the lottery. Thus, the way of providing a lottery occasion to the user can be diversified. In addition, for example, in the game, if ease of acquisition of the first virtual currency is set to be higher than ease of acquisition of the second virtual currency (the first virtual currency is set to be more easily acquired), user's interest in lottery for the first presentation element can be enhanced.

In another configuration example, the presentation element specified by the first lottery may be presented to the user irrespective of whether or not the first virtual currency or the second virtual currency is spent.

According to the above configuration example, regarding the presentation element specified by the first lottery, it becomes possible to exchange the presentation element irrespective of whether or not the virtual currency is spent. Thus, amusement in providing content to the user by lottery can be improved.

In another configuration example, as the first lottery, a lottery for specifying at least one presentation element from a plurality of the second presentation elements may be performed.

According to the above configuration example, as the first presentation element, the one that is drawn by lottery from the second presentation elements can be used. Therefore, while the user enjoys a lottery for the first presentation elements for which the first virtual currency can be used, even if the first presentation element that the user desires is not drawn by a lottery, the user is allowed to directly perform a lottery based on the second presentation element by using the second virtual currency. Thus, while amusement of lottery is kept, occasions to acquire content that the user desires can be increased, and as a result, it is possible to shorten a time required for acquiring the content.

In another configuration example, the first presentation element specified by the first lottery may be displayed in a first display area, and the second presentation element may be displayed in a second display area different from the first display area.

According to the above configuration example, it is possible to present, to the user, the presentation element for which the first virtual currency is used, and the presentation element for which the second virtual currency can be used, in an easily understandable manner.

In another configuration example, the at least one computer may further execute, if the second lottery has been performed a predetermined number of times, restricting processing of the second lottery or processing of the providing until the predetermined timing.

According to the above configuration example, when the predetermined timing has come, the second lottery is enabled to be performed. Therefore, it is possible to provide the user with a motivation for activating a predetermined application after the predetermined timing. For example, property such as "out-of-stock" or "sold-out" can be set for the presentation elements. Thus, for example, the user can be interested in what presentation element will "arrive in a shop" next time, whereby a motivation for continuing to play the game or the like can be provided.

In another configuration example, if the second lottery has been performed with respect to a predetermined presentation element among the presentation elements a predetermined number of times, processing of the second lottery or processing of the providing with respect to the predetermined presentation element may be restricted until the predetermined timing.

According to the above configuration example, for example, if the second lottery for a presentation element specified by the first lottery has been performed a predetermined number of times, use of the presentation element can be prohibited until a predetermined timing. Thus, it is possible to provide the user with a motivation for activating a predetermined application after the predetermined timing.

In another configuration example, the at least one computer may further execute restricting processing of the second lottery or processing of the providing until the predetermined timing, if the second lottery for specifying at least one content from the content group associated with the first presentation element has been performed a predetermined number of times.

According to the above configuration example, it is possible to set no restriction on the number of times of the second lottery for the second presentation element while setting restriction on the number of times of the second lottery for the first presentation element. Thus, amusement of lottery can be improved.

In another configuration example, the first lottery may be performed for specifying at least one presentation element among the plurality of presentation elements for which the respective associated content groups are at least partially different from each other.

According to the above configuration example, lottery targets associated with each presentation element are at least partially different among the presentation elements. Thus, amusement of lottery can be improved.

In another configuration example, the at least one computer may further executing storing information about a plurality of users in a storage portion in such a manner as to allow the information to be identified on a user-by-user basis. Processing of the first lottery, the presenting, the second lottery, and the providing may be executed on a user-by-user basis.

According to the above configuration example, the first lottery is performed on a user-by-user basis, whereby the presentation element to be presented to each user can be made different among the users. Thus, amusement of lottery can be improved.

In another configuration example, an object associated with the presentation element specified by the first lottery may be presented as the presentation element, to the user.

According to the above configuration example, the user can confirm a result of the first lottery in a virtual space, and therefore amusement of lottery can be improved. For example, the user can "purchase" the presentation element as a virtual product, and further, the user is also allowed to, for example, carry the presentation element in the game. This can provide the user with such a sense of play as to "buy" the lottery itself.

According to the exemplary embodiments, it is possible to improve amusement of lottery.

BRIEF DESCRIPTION OF THE DRAWINGS

FIG. 6 shows a non-limiting example of a data configuration of a furniture database 502;

FIG. 7 shows a non-limiting example of a data configuration of a cookie database 503;

FIG. 8 shows a non-limiting example of a data configuration of a cookie appearance database 504;

FIG. 9 shows a non-limiting example of a data configuration of a cookie appearance rate database 505 based on rareness degree;

FIG. 10 shows a non-limiting example of a data configuration of a presented-cookie data 506;

DETAILED DESCRIPTION OF NON-LIMITING EXAMPLE EMBODIMENTS

[Hardware Configuration of Information Processing Terminal]

Figure 1:
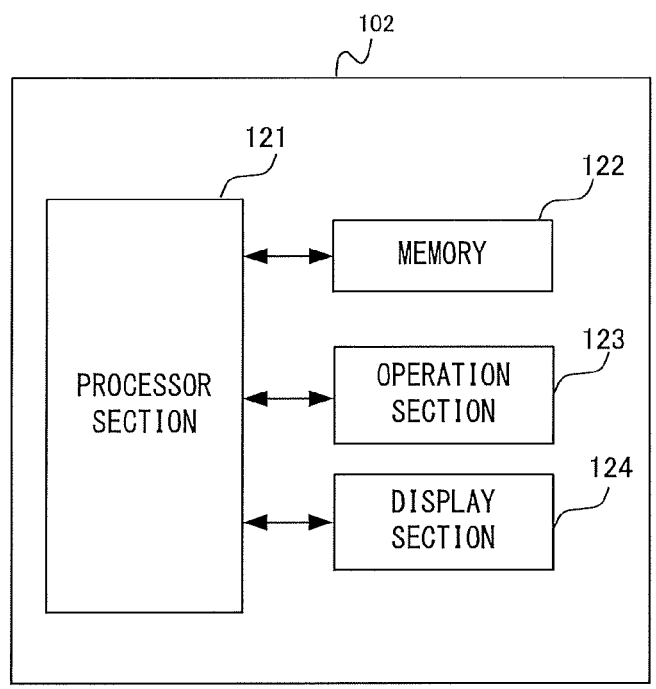
FIG. 1 is a block diagram showing a hardware configuration of an information processing terminal 102.

Hereinafter, one exemplary embodiment will be described. It is to be understood that as used herein, elements and the like written in a singular form with a word "a" or "an" attached before them do not exclude those in a plural form. FIG. 1 is a block diagram showing a hardware configuration of an information processing terminal 102 which executes an information process according to the exemplary embodiment. Here, in the exemplary embodiment, for example, a smart device such as a smartphone and a tablet, a game apparatus such as a stationary game apparatus and a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to an information processing terminal wirelessly or via wire may be employed, or for example, an input apparatus formed integrally with the information processing terminal may be employed. Regarding the information processing terminal 102, in another exemplary embodiment, an information processing system composed of a plurality of information processing apparatuses may be adopted. Then, the processes as described below may be executed so as to be shared among the plurality of information processing apparatuses.

In FIG. 1, the information processing terminal 102 includes a processor section 121, a memory 122, an operation section 123, and a display section 124. The processor section 121 executes a later-described game process or executes a system program (not shown) for controlling overall operation of the information processing terminal 102, thereby controlling operation of the information processing terminal 102. The processor section 121 may include a single processor or a plurality of processors. In the memory 122, various programs to be executed by the processor section 121 and various kinds of data to be used in the programs are stored. The memory 122 is, for example, a flash EEPROM or a hard disk device. The operation section 123 is an input device for receiving an operation from a user, and in the exemplary embodiment, a touch panel is mainly assumed as the operation section 15. In another exemplary embodiment, the operation section 123 may be various pointing devices, various press-type buttons, an analog stick, and the like. The display section 124 is typically a liquid crystal display device.

[Outline of Information Process (Game Process) of the Exemplary Embodiment]

Next, the outline of the information process executed in the exemplary embodiment will be described. First, in the exemplary embodiment, an application process in which predetermined content can be acquired by a "lottery" process is assumed. This lottery is called, for example, "gacha" or the like. More specifically, as an example of the application, a game application process (hereinafter, referred to as game process) is assumed. As an example of the content acquired by the lottery, "in-game content" which can be used in the game is assumed.

Examples of the "in-game content" are as follows: a character, a unit, items such as weapon and protector, abilities such as magic and skill, etc., that appear in the game.

Here, the game process assumed in the exemplary embodiment will be described more specifically. In the game according to the exemplary embodiment, a player character lives virtually in a virtual game world in which various virtual characters (resident characters) live. For example, the player character can collect various items to build an own house, or maintains a garden. In addition, it is also possible to do hunting, fishing, or the like or have a conversation or the like with a resident character in the game, to obtain various items.

In the following description, as an example of the in-game content, "furniture" that can be arranged in the own house will be described. That is, in the process according to the exemplary embodiment, the user can acquire a predetermined piece of furniture by a lottery process.

An acquisition (lottery) method for the furniture will be described more specifically. In the exemplary embodiment, the user can acquire a piece of furniture by lottery. In the exemplary embodiment, the user purchases a "cookie" in the game, and causes the player character to eat the "cookie", to start the lottery. As a result, the user can acquire one predetermined piece of furniture selected by the lottery.

It is noted that a "rareness degree" is set for each piece of furniture, and the winning probability differs depending on each rareness degree. For example, the rareness degrees are set at four levels such as SS-rare-ranked furniture, S-rareranked furniture, rare-ranked furniture, and normal-ranked furniture. For example, the winning probability for the SS-rare-ranked furniture is set to be the lowest.

In the game according to the exemplary embodiment, the user can purchase the "cookie" at a "shop" in the game. In this game, as means for purchasing a cookie at the shop, there are two types of purchase methods. Specifically, there are a purchase method using virtual currency called "bell" in the game, and a purchase method using, in the game, virtual currency called "ticket" which is virtual currency different from the bell.

Here, difference between the two types of virtual currency in the exemplary embodiment will be described. First, the method for acquiring the "bell" is confined within the game world. For example, the "bell" can be acquired by selling the "furniture". In addition, the "bell" can also be acquired by selling an item obtained by the fishing or hunting. Besides, the "bell" can also be acquired as a so-called "quest" reward. In addition, since the "bell" can be acquired by selling furniture, it is also possible to acquire the "bell" as funds for purchasing another piece of furniture by selling an unnecessary piece of furniture. On the other hand, the "ticket" is virtual currency that can be acquired also by a so-called settlement process using real-world currency, i.e., so-called "cash payment". That is, the "ticket" is virtual currency provided to the user in accordance with the paid money amount. Besides acquisition by cash payment as described above, the "ticket" can also be acquired as a quest reward, but unlike the "bell", it is impossible to acquire the "ticket" by selling an item such as furniture in the game.

Figure 2:
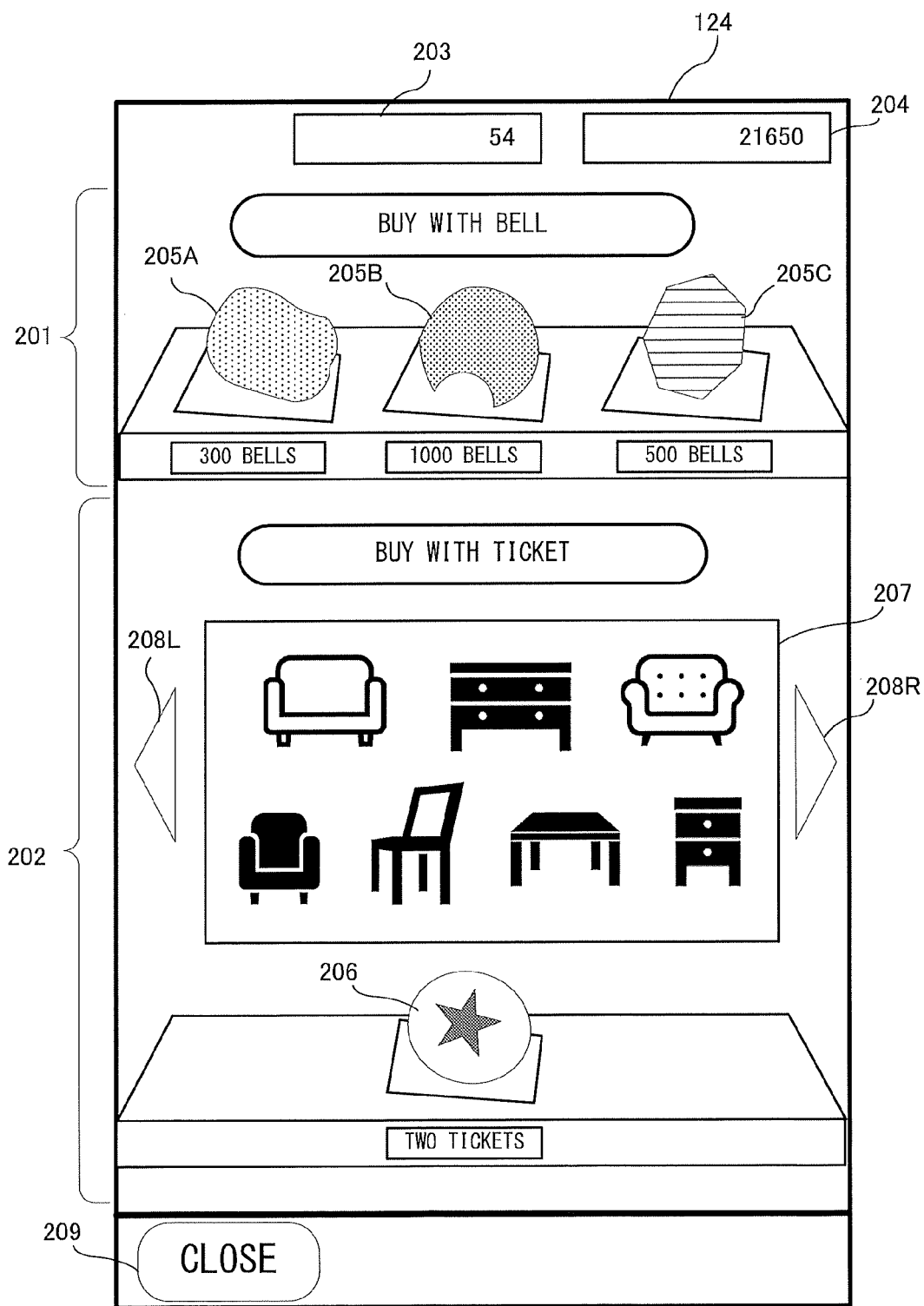
FIG. 2 shows a non-limiting example of a game screen.

FIG. 2 shows an example of a screen of the "shop" displayed at the time of purchasing the "cookie". This screen is displayed by the user tapping a wagon object indicating a shop on a screen of an "open space" area provided in the game, for example. In FIG. 2, on the shop screen, a first cookie presentation area 201 representing a shelf on which three "cookies" are exhibited, and a second cookie presentation area 202 representing a shelf on which one "cookie" is exhibited, are displayed. These "cookies" can also be said to be presentation elements for presenting lottery targets to the user. Near the upper end of the screen, the number 203 of possessed tickets and the number 204 of possessed bells are indicated. In addition, at the lower part of the screen, a "close" button 209 for ending the shop screen is also indicated.

Figure 3:
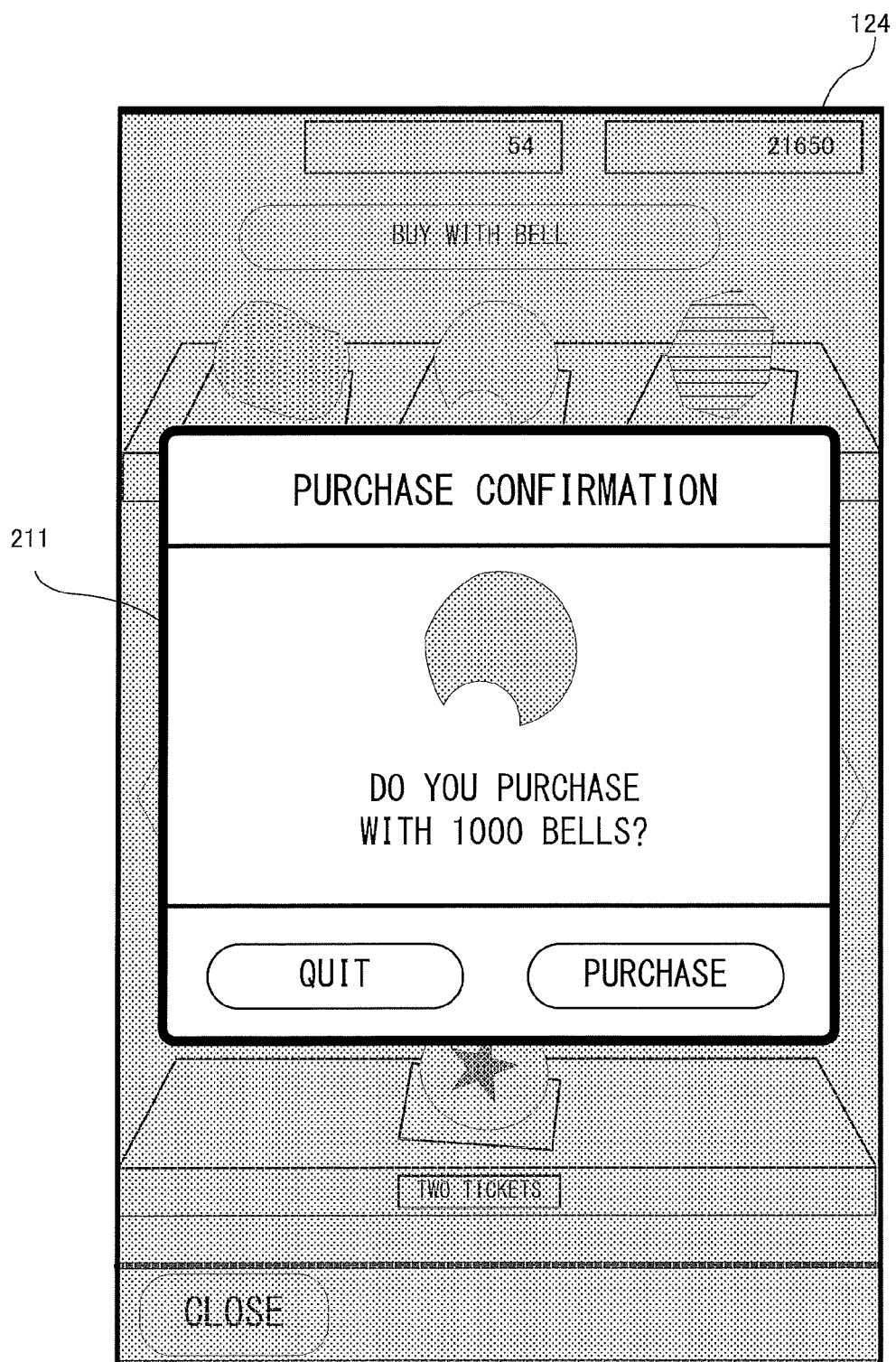
FIG. 3 shows a non-limiting example of a game screen.

In the first cookie presentation area 201, three cookie images 205A to 205C are displayed so as to be exhibited on the shelf. In the exemplary embodiment, an upper limit is set for the number of "cookies" that can be exhibited at once in the first cookie presentation area 201. In this example, the upper limit is three. Needless to say, this number is merely an example and the number of cookies that can be exhibited may be set to another value. On the lower side of each cookie image, the price thereof is also indicated. By performing an operation of selecting one of the cookie images 205A to 205C, the user can purchase the "cookie" using "bells". In the exemplary embodiment, as an example of the selection operation, an operation of "tapping" the cookie image is assumed. FIG. 3 shows an example of a purchase confirmation screen displayed when one of the cookies in the first cookie presentation area 201 is tapped. In FIG. 3, a dialogue box 211 is displayed for asking whether or not to purchase the "cookie" selected by tapping, by spending "bells" corresponding to the price set for the "cookie". By tapping a "purchase" button, the user can purchase the "cookie" by spending a predetermined number of "bells". In addition, by tapping a "quit" button, the user can cancel the purchase and return to the previous screen.

In the exemplary embodiment, the "cookies" exhibited in the first cookie presentation area 201 are exchanged with a predetermined cycle. Specifically, in the exemplary embodiment, the "cookies" are exchanged once a day, when a predetermined time (for example, 16:00) has come. That is, the lineup of "cookies" exhibited in the first cookie presentation area 201 is changed every 24 hours. In the exemplary embodiment, for each of the "cookies" (cookie images 205A to 205C) in each cycle, the quantity of stock is set at 1. Therefore, the user can purchase only one of each "cookie" in each cycle. If one of the "cookies" in the first cookie presentation area 201 is purchased, an image indicating a "sold-out" state is once displayed at the location where the purchased "cookie" had been displayed. The "sold-out" state continues until exchange in the next cycle occurs. Even in the case where none of the "cookies" have not been purchased, exchange of "cookies" occurs when the above exchange time has come. This can give a motivation for playing the game again on the next day.

In another exemplary embodiment, at the above exchange, "replenishment" may be performed for only the sold-out "cookie", instead of exchanging all the "cookies". Also, the quantity of stock for each "cookie" in each cycle may be set at two or more.

In the exemplary embodiment, which "cookie" is to be exhibited in the first cookie presentation area 201 is determined by a lottery process. Hereinafter, the lottery process for the "cookie" to be exhibited will be described. First, in the exemplary embodiment, as the "cookies", twenty types of "cookies" are prepared. As the "furniture", for example, 140 types of furniture are prepared. The "cookies" are each different in terms of lottery target furniture. For example, for a "cookie A", seven types of furniture among the 140 types of furniture are selected and set as lottery targets. For a "cookie B", other seven types of furniture different from those for the "cookie A" are set as lottery targets. For a "cookie C", seven types of furniture different from those for the "cookie A" and the "cookie B" are set as lottery targets. In the exemplary embodiment, the types of lottery target furniture for the respective "cookies" do not overlap each other. However, in another exemplary embodiment, the types of lottery target furniture may partially or entirely overlap each other among the "cookies".

Further, for each of the twenty types of "cookies", a rareness degree is set. For a "cookie" having a high rareness degree, pieces of furniture having high rareness degrees are set as the lottery targets, and the price of the "cookie" is also set to be higher. In addition, the higher the rareness degree of a "cookie" is, the lower the probability that the "cookie" is exhibited in the first cookie presentation area 201 is. That is, a "cookie" having a higher rareness degree is less likely to be exhibited in the first cookie presentation area 201. As it were, such a "cookie" is considered to be a rare cookie which rarely appears in the shop.

Next, the second cookie presentation area 202 will be described. One cookie image 206 exhibited on the shelf is displayed in the second cookie presentation area 202. On the lower side of the cookie image 206, the price of the cookie is also indicated. On the upper side thereof, a lottery content presentation image 207 indicating lottery target furniture for the "cookie" is indicated. Further, on both sides of the lottery content presentation image 207, switch buttons 208L and 208R are indicated. By tapping the switch button 208L or 208R, the user can switch the cookie image 206 and the lottery content presentation image 207 presented in the second cookie presentation area 202, in such a manner as to scroll in the right-left direction.

The cookie images that can be presented in the second cookie presentation area 202 include all of the twenty types of cookies described above. Therefore, the user can sequentially display all types of "cookies" and the corresponding lottery content presentation images 207 one by one using the switch button 208L or 208R. In other words, in the second cookie presentation area 202, all types of "cookies" are presented in a selectable manner for the user, and in the first cookie presentation area 201, three cookies selected thereamong by lottery are presented. As for the "cookies" to be presented in the second cookie presentation area 202, all types of cookies may not necessarily be targets to be presented. In another exemplary embodiment, for example, only cookies having high rareness degrees may be targets to be presented in the second cookie presentation area 202 (for example, only SS-rare-ranked "cookies" may be targets to be presented).

Figure 4:
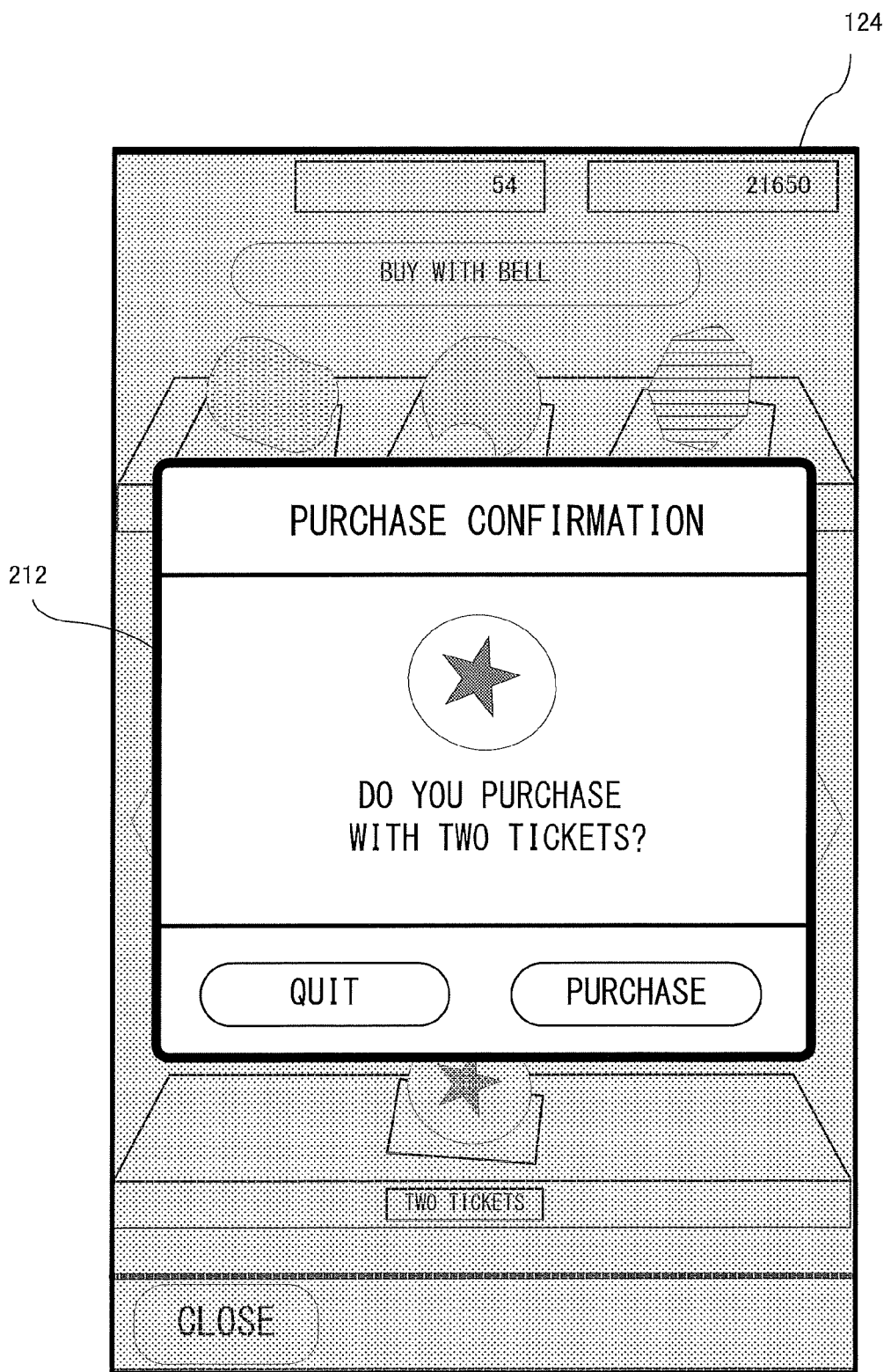
FIG. 4 shows a non-limiting example of a game screen.

By tapping the cookie image 206 in the second cookie presentation area 202, the user can purchase the cookie using the above "ticket". FIG. 4 shows an example of a purchase confirmation screen displayed when the cookie image 206 presented in the second cookie presentation area 202 is tapped. In FIG. 4, a dialogue box 212 is displayed for asking whether or not to purchase the "cookie" selected by tapping, by spending "tickets" corresponding to the price set for the "cookie". By tapping a "purchase" button, the user can purchase the "cookie" by spending a predetermined number of "tickets". In addition, by tapping a "quit" button, the user can cancel the purchase and return to the previous screen.

It is noted that, in the second cookie presentation area 202, in the exemplary embodiment, no limit is set for the quantity of stock for each "cookie". Therefore, it is also possible to purchase the same "cookie" consecutively. In addition, since all types of "cookies" are targets to be purchased, "exchange" of "cookies" as in the first cookie presentation area 201 also does not occur. That is, by using "tickets", the user can perform "designated purchase" from among all types of "cookies". In another exemplary embodiment, a limit of the quantity of stock may be set also for the "cookies" in the second cookie presentation area 202, in the same manner as described above.

[Details of Game Process in the Exemplary Embodiment]

Next, with reference to FIG. 5 to FIG. 12, the game process according to the exemplary embodiment will be described in more detail.

[Used Data]

Figure 5:
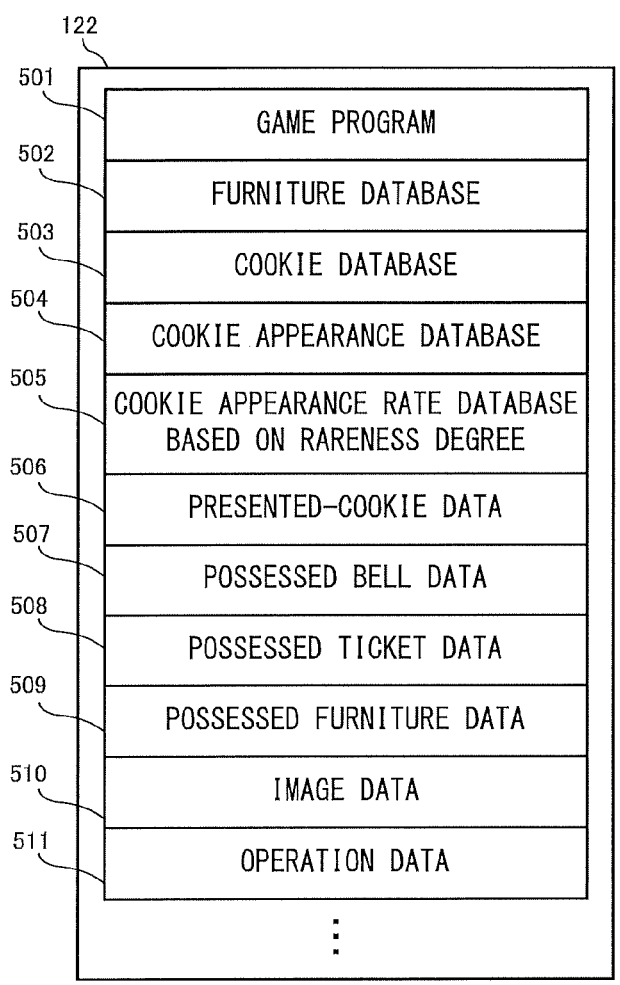
FIG. 5 shows a non-limiting example of data stored in a memory 122.

First, various types of data used in this game process will be described. FIG. 5 is a memory map showing an example of various types of data stored in the memory 122 of the information processing terminal 102. The memory 122 of the information processing terminal 102 stores a game program 501, a furniture database 502, a cookie database 503, a cookie appearance database 504, a cookie appearance rate database 505 based on rareness degree, presented-cookie data 506, possessed bell data 507, possessed ticket data 508, possessed furniture data 509, image data 510, operation data 511, and the like.

The game program 501 is a program for executing the game process according to the exemplary embodiment.

The furniture database 502 is data that defines the "furniture" described above. FIG. 6 shows an example of a data configuration of the furniture database 502. The furniture database 502 is composed of a furniture ID 521, furniture detail data 522, and a rareness degree 523. The furniture ID 521 is an identifier for uniquely identifying each piece of furniture. The furniture detail data 522 is data that defines the specific details of each piece of furniture. For example, the furniture detail data 522 includes information that defines an outer appearance image of each piece of furniture and the type thereof (desk, chair, etc.). The rareness degree 523 is data indicating the rareness degree of each piece of furniture.

Returning to FIG. 5, the cookie database 503 is data that defines each "cookie". FIG. 7 shows an example of the data structure of the cookie database 503. In FIG. 7, the cookie database 503 is a table-style database having items that are a cookie ID 531, a rareness degree 533, and lottery target data 534.

The cookie ID 531 is an ID for uniquely identifying the type of each "cookie".

The rareness degree 533 is data that indicates the rareness degree of each "cookie".

The lottery target data 534 is data that defines pieces of furniture that are lottery targets for each "cookie". Specifically, the lottery target data 534 is table-style data composed of a furniture ID 535 and an appearance rate 536. The furniture ID 535 indicates IDs for discriminating and identifying pieces of furniture that are lottery targets for each "cookie", and is associated with the furniture ID 521 of the furniture database 502. The appearance rate 536 is data that defines the appearance rate of each piece of furniture.

Besides, although not shown, data indicating the price of each "cookie", data indicating the image of each "cookie", and the like are stored as appropriate in the cookie database 503.

Returning to FIG. 5, the cookie appearance database 504 is data that defines the appearance rate of each "cookie" in a lottery for whether or not to exhibit the cookie in the first cookie presentation area 201. FIG. 8 shows an example of the configuration of the cookie appearance database 504. The cookie appearance database 504 is table-style data composed of a cookie ID 541 and an appearance rate 542. The cookie ID is an ID for identifying each "cookie" and is associated with the cookie ID 531 of the cookie database 503. The appearance rate 542 is data that defines the appearance rate for each "cookie".

Returning to FIG. 5, the cookie appearance rate database 505 (hereinafter, referred to as rareness degree database) based on rareness degree is data that defines the appearance rate for each rareness degree of the "cookies". FIG. 9 shows an example of the configuration of the rareness degree database 505. The rareness degree database 505 is data composed of a rareness degree 551 indicating each rareness degree, and an appearance rate 552 that defines the appearance rate for each rareness degree.

Returning to FIG. 5, the presented-cookie data 506 is data indicating "cookies" that are being exhibited in the first cookie presentation area 201. FIG. 10 shows an example of the data configuration of the presented-cookie data 506. The presented-cookie data 506 is composed of a frame number 561, a cookie ID 562, and a sold-out flag 563. The frame number 561 indicates exhibition frames in the first cookie presentation area 201. In the exemplary embodiment, the number of the frames is three. The cookie ID 562 is an ID indicating the "cookie" exhibited in each frame, and is associated with the cookie ID 531 of the cookie database 503. The sold-out flag 563 is a flag indicating whether or not the "cookie" in each frame has been sold out. In the exemplary embodiment, since the quantity of stock for each cookie in the first cookie presentation area 201 is set at 1, the sold-out flag 563 is set to ON when a purchase is performed. It is noted that, in the case where the quantity of stock is set at two or more in another exemplary embodiment, management may be performed with the sold-out flag 563 modified to data indicating the "quantity of stock".

Returning to FIG. 5, the possessed bell data 507 is data indicating the number of "bells" that the user possesses. The possessed ticket data 508 is data indicating the number of "tickets" that the user possesses. The possessed furniture data 509 is data indicating furniture that the user possesses. The image data 510 is data of images of "cookies" and images of a shop screen and the like. The operation data 511 is data indicating an operation performed on the operation section 123 by the user.

Besides, various working data and the like used in this process are stored as appropriate in the memory 122.

[Details of Process Executed by Processor Section 121]

Next, with reference to flowcharts shown in FIG. 11 and FIG. 12, the details of the game process according to the exemplary embodiment will be described. Here, a process (hereinafter, referred to as cookie shop process) relevant to the "shop" for purchasing a "cookie" will be mainly described, and the description of the other game processes is omitted.

Figure 11:
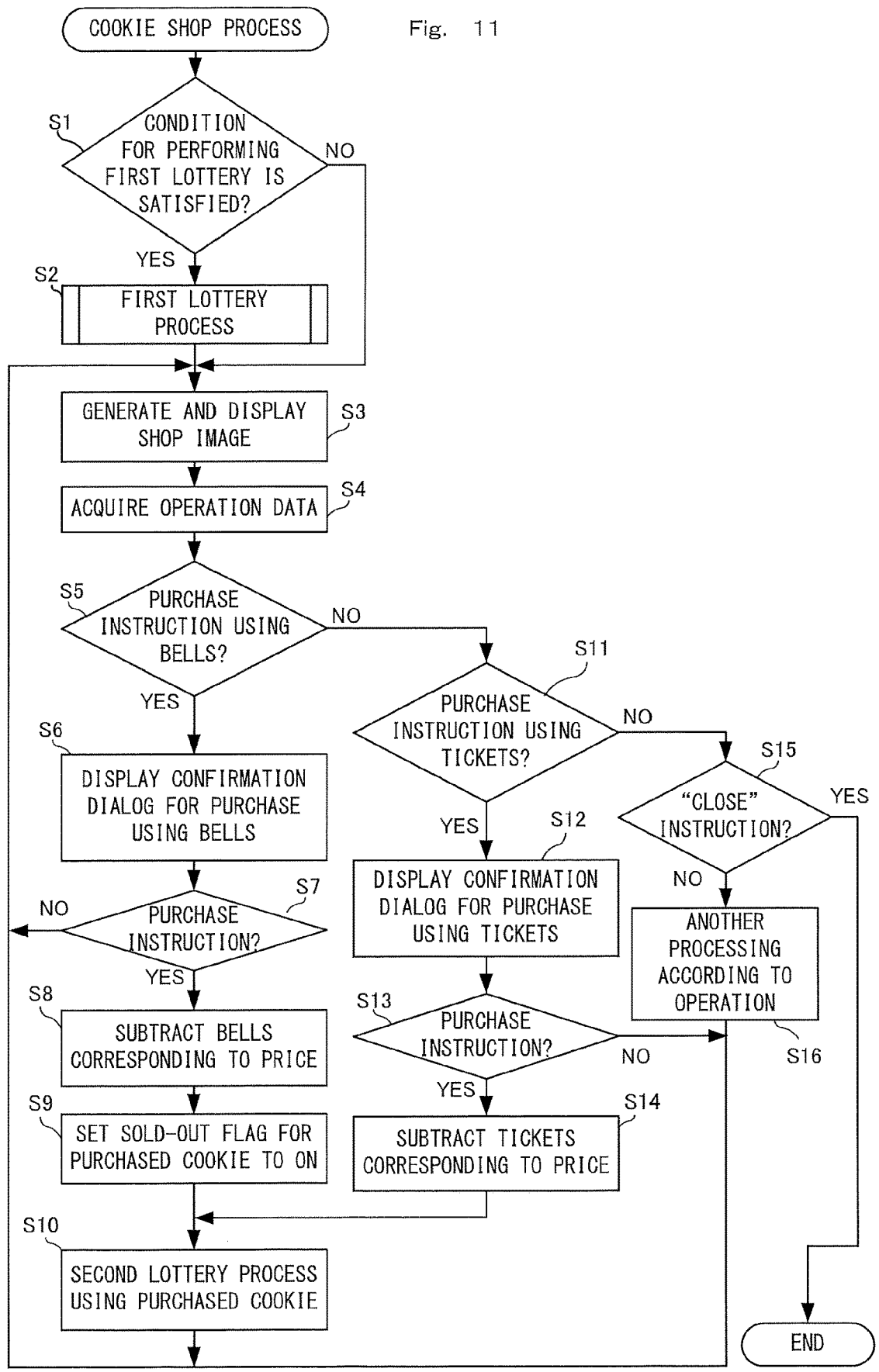
FIG. 11 is a flowchart showing the details of a cookie shop process.

FIG. 11 is a flowchart showing the details of the cookie shop process according to the exemplary embodiment. Execution of this process is started by the user tapping a wagon object indicating a shop on a screen of an "open space" area provided in the game, for example. In the following description, a lottery for a "cookie" to be exhibited in the first cookie presentation area 201 is referred to as "first lottery". In addition, a lottery for furniture based on a "cookie" purchased by the user is referred to as "second lottery". Setting is made such that exchange of "cookies" in the first cookie presentation area 201 is to be performed at 16:00 every day.

First, in step S1, the processor section 121 determines whether or not a condition for performing the first lottery is satisfied. In the exemplary embodiment, in a state in which the first lottery for this day has not been performed yet, if the current time is 16:00 set as an exchange time, or past that time, it is determined that the condition for performing the first lottery is satisfied. In addition, also in the case where the first lottery has not been performed yet even once, e.g., at the time of initial starting of this game, it is determined that the condition for performing the first lottery is satisfied. As a result of the determination, if the condition for performing the first lottery is satisfied (YES in step S1), in step S2, the processor section 121 executes a first lottery process and proceeds to step S3. On the other hand, if the condition for performing the first lottery is not satisfied (NO in step S1), the processing in step S2 is skipped and the process proceeds to step S3.

Figure 12:
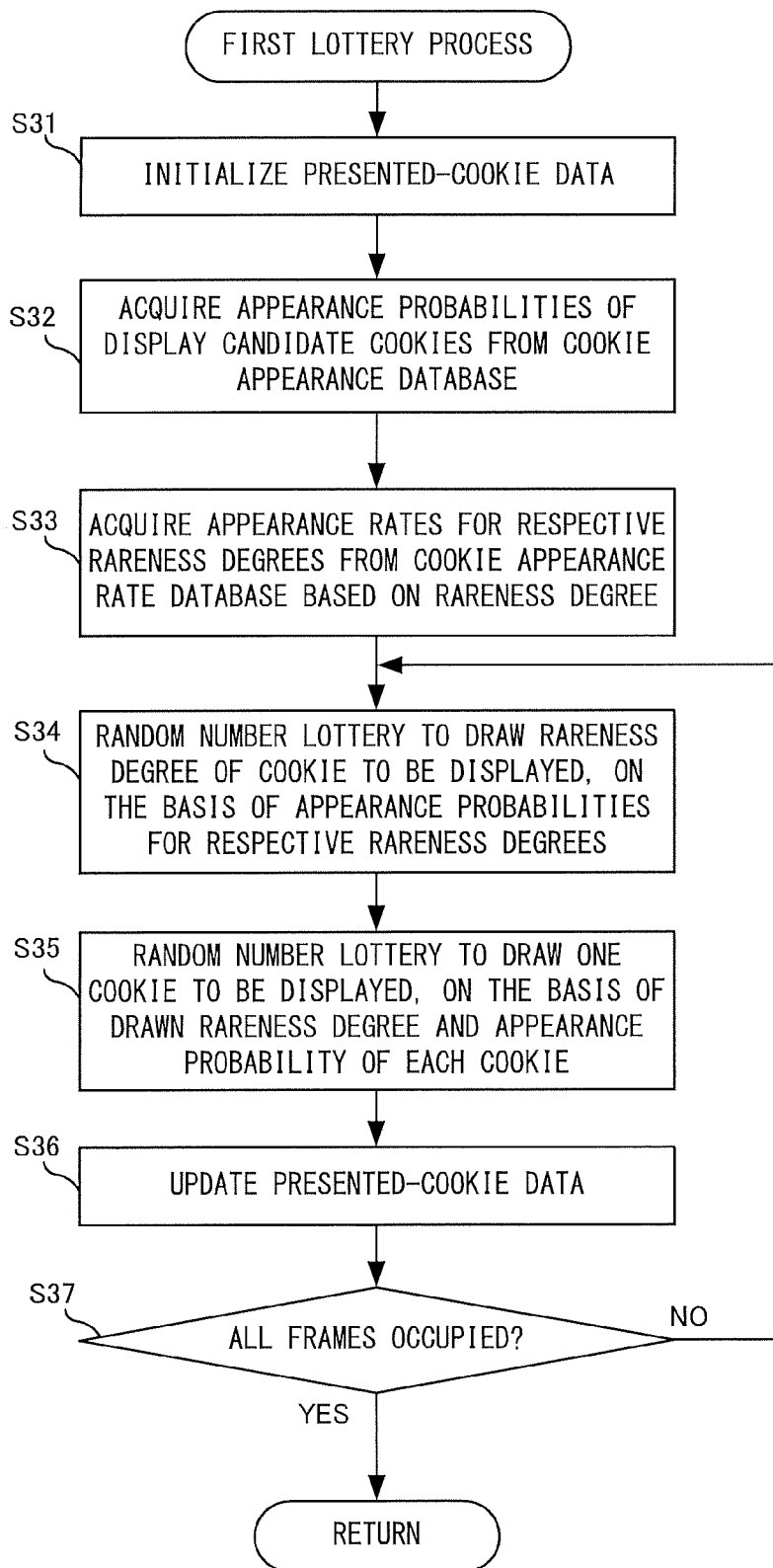
FIG. 12 is a flowchart showing the details of a first lottery process.

FIG. 12 is a flowchart showing the details of the first lottery process. In this process, processing of determining a "cookie" to be exhibited in the first cookie presentation area 201 by lottery is executed. In FIG. 12, first, in step S31, the processor section 121 clears the content of the presented-cookie data 506 to initialize the data.

Next, in step S32, the processor section 121 refers to the cookie appearance database 504 and acquires the appearance rates 542 for all the "cookies".

Next, in step S33, the processor section 121 refers to the rareness degree database 505 to acquire the appearance rates 552 for the respective rareness degrees.

Next, in step S34, the processor section 121 performs a lottery to draw the rareness degree of a cookie to be exhibited, on the basis of the appearance rates 552 for the respective rareness degrees.

Next, in step S35, the processor section 121 performs a lottery using a random number, to draw one "cookie" to be exhibited, on the basis of the drawn rareness degree and the appearance rate of each "cookie".

Next, in step S36, the processor section 121 adds data indicating the drawn "cookie", to the presented-cookie data 506. That is, the processor section 121 sets the cookie ID indicating the drawn "cookie", for the cookie ID 562 corresponding to the smallest one of the frame numbers 561 that have not been occupied yet, and sets the sold-out flag 563 to OFF.

Next, in step S37, the processor section 121 refers to the presented-cookie data 506 to determine whether or not "cookies" have been set for all the frames (in the exemplary embodiment, three frames). As a result of the determination, if there is a vacant frame left (NO in step S37), the process returns to the above step S34 to repeat the processing. On the other hand, if all the frames have been occupied (YES in step S37), the first lottery process is ended.

Returning to FIG. 11, next, in step S3, the processor section 121 generates a shop screen on the basis of the presented-cookie data 506. Specifically, the processor section 121 refers to the presented-cookie data 506 and places the image of the "cookie" corresponding to the cookie ID 562 at the frame for which the sold-out flag 563 is OFF, in the first cookie presentation area 201. At the frame for which the sold-out flag 563 is ON, the image indicating a sold-out state is placed. In addition, in the second cookie presentation area 202, the image of a predetermined "cookie" (this may be selected randomly or an image corresponding to a "cookie" set in advance may be used), and the lottery content presentation image 207 corresponding thereto, are placed. Then, a shop image as shown in FIG. 2 is generated. Further, the processor section 121 also performs processing of displaying the generated shop screen.

Next, in step S4, the processor section 121 acquires the operation data 511. In the subsequent step S5, the processor section 121 determines whether or not the operation indicated by the operation data 511 is a purchase instruction using the "bell". Specifically, the processor section 121 determines whether or not one of the cookie images 205A to 205C in the first cookie presentation area 201 has been tapped. As a result of the determination, if one of the cookie images 205A to 205C has been tapped (YES in step S5), in step S6, the processor section 121 performs processing of displaying a confirmation dialogue for purchase using bells. Specifically, the processor section 121 performs processing of generating and displaying the dialogue box 211 as shown in FIG. 3, on the basis of the tapped "cookie". Then, the processor section 121 is to receive an operation from the user.

Next, in step S7, the processor section 121 acquires the operation data 511 and determines whether or not a purchase instruction operation has been performed on the dialogue box 211. If an instruction to cancel purchase has been performed instead of a purchase instruction (NO in step S7), the processor section 121 deletes the purchase confirmation dialogue and returns to the processing of step S3. On the other hand, if a purchase instruction has been performed (YES in step S7), in step S8, the processor section 121 subtracts "bells" corresponding to the price set for the tapped "cookie" from the possessed bell data 507. Further, in step S9, the processor section 121 sets the sold-out flag 563 corresponding to the purchased "cookie" in the presented-cookie data 506, to ON.

Next, in step S10, the processor section 121 performs a second lottery on the basis of the purchased "cookie". That is, in the exemplary embodiment, when the user has purchased the "cookie", the second lottery is performed immediately. Specifically, the processor section 121 refers to the cookie database 503 and acquires the lottery target data 534 corresponding to the purchased "cookie". Thus, the processor section 121 can acquire information about pieces of furniture that can be acquired from that "cookie", and the appearance rates of these pieces of furniture. Further, the processor section 121 performs a lottery to draw a piece of furniture to be provided to the user, on the basis of the appearance rates. Then, the processor section 121 adds the drawn piece of furniture to the possessed furniture data 509, thereby providing the drawn piece of furniture to the user.

In the processing for the second lottery, a predetermined production may be displayed. For example, on the basis of the rareness degree of the drawn piece of furniture, a production image, a message, or the like according to the rareness degree may be displayed. In addition, a plurality of production images and/or a plurality of messages may be prepared for each rareness degree, and a production image and/or a message to be displayed may be further determined by lottery.

After the processing of step S10 is finished, the process returns to the above step S3 to repeat the processing.

Next, processing performed in the case where, as a result of the determination in step S5, none of the cookie images 205A to 205C in the first cookie presentation area 201 have been tapped (NO in step S5), will be described. In this case, in step S11, the processor section 121 determines whether or not the operation indicated by the operation data 511 is a purchase instruction using the "ticket". Specifically, the processor section 121 determines whether or not the cookie image 206 in the second cookie presentation area 202 has been tapped. As a result of the determination, if the cookie image 206 of the second cookie presentation area 202 has been tapped (YES in step S11), in step S12, the processor section 121 performs processing of displaying a confirmation dialogue for purchase using tickets. Specifically, the processor section 121 performs processing of generating and displaying the dialogue box 212 as shown in FIG. 4, on the basis of the tapped "cookie". Then, the processor section 121 is to receive an operation from the user.

Next, in step S13, the processor section 121 acquires the operation data 511 and determines whether or not a purchase instruction operation has been performed on the dialogue box 212. If an instruction to cancel purchase has been performed instead of a purchase instruction (NO in step S13), the processor section 121 deletes the purchase confirmation dialogue and returns to the processing of step S3. On the other hand, if a purchase instruction has been performed (YES in step S13), in step S14, the processor section 121 subtracts "tickets" corresponding to the price set for the tapped "cookie", from the possessed ticket data 508. Thereafter, the process proceeds to step S10 described above, to perform the second lottery processing based on the "cookie" purchased by the tickets.

On the other hand, as a result of the determination in step S11, if the cookie image 206 in the second cookie presentation area 202 also has not been tapped (NO in step S11), in step S15, the processor section 121 determines whether or not the close button 209 has been tapped. As a result of the determination, if the close button 209 also has not been tapped (NO in step S15), the processor section 121 performs another game process based on the operation indicated by the operation data 511, as appropriate. For example, if the switch button 208L or 208R is tapped, processing for switching the presented content in the second cookie presentation area 202 is performed. Thereafter, the process returns to step S3 to repeat the processing. On the other hand, if the close button 209 has been tapped (YES in step S15), the shop process is ended.

Thus, the detailed description of the shop process is finished.

As described above, in the exemplary embodiment, the lottery process for determining which "cookie" is to be exhibited in the first cookie presentation area 201 is performed. In addition, a rareness degree is also set for each "cookie", and thus the lottery is performed considering also such a matter. Then, three "cookies" determined as a result of the lottery process are exhibited in the first cookie presentation area 201. As it were, processing is performed in which "gacha" objects for acquiring pieces of furniture are exhibited in a purchasable manner in the shop and the "gacha" objects (the lineup thereof) to be exhibited are also determined by lottery. In this regard, in the conventional case, the lottery targets are determined depending on only the administrator's setting. However, in the exemplary embodiment, the lottery targets (furniture) are also determined by lottery. Thus, amusement based on what "cookies" will be exhibited, i.e., what pieces of furniture are lottery targets, is provided to the user on a daily basis, whereby amusement of the lottery process is further enhanced and also a motivation for consecutive play is provided so that the user logs in to the game every day to play the game, for example.

Further, the second cookie presentation area 202 that allows "designated purchase" as described above is used in combination, thereby providing a possibility of shortening a time required to acquire a piece of furniture that the user desires. That is, even in the case where it takes a long time until a "cookie" associated with pieces of furniture having high rareness degrees appears in the first cookie presentation area 201, it is also possible to purchase such a desired "cookie" immediately by using "tickets". Therefore, an occasion to acquire a piece of furniture that the user desires can be provided to the user immediately. Thus, it is also possible to make it easy to satisfy the user's desire while keeping the amusement of the lottery process.

[Modifications]

In the above exemplary embodiment, the case where the game process is executed by a single information processing apparatus has been shown as an example. However, regarding the subject that executes the process as described above, a configuration other than the above configuration may be adopted. For example, in another exemplary embodiment, the information processing apparatus and a predetermined server may be configured to be communicable with each other, and the various types of data and the information processes described above may be partially stored and executed at the predetermined server. A system on the server side may be configured from a plurality of information processing apparatuses and a process to be executed on the server side may be executed so as to be shared among the plurality of information processing apparatuses. In such a case, for example, data about users who use the game is stored in the server on a user-by-user basis. Then, at the start of the game, a user is caused to perform processing for logging in to the server, necessary data is downloaded from the server onto the information processing apparatus 102, and the information processing apparatus 102 and the predetermined server cooperate to execute the information process as described above. In addition, in this case, the first lottery may be performed on a user-by-user basis. That is, "cookies" exhibited in the first cookie presentation area 201 may differ among the users. Then, a piece of furniture provided as a result of the lottery may be reflected into the data about the user and thus the data may be stored in the server (namely, the data of the user may be updated). The first lottery may be performed on the information processing terminal side or may be performed on the server side. Conversely, regarding the first lottery, the lottery result may be the same among the users. For example, the first lottery may be performed at the server at a predetermined time every day, and data indicating the result may be shared among the information processing terminals.

Besides, the above processing may be applied to the case where, for example, a plurality of user accounts are stored in a single game apparatus, i.e., a single game apparatus is shared by a plurality of users. For example, at the time of starting play of the game, a user may be caused to select a user account to be used, and the above processing may be executed for each user account.

Regarding the timing of performing the first lottery, in the above example, the first lottery is executed repeatedly at regular intervals, i.e., once a day. However, without limitation thereto, in another exemplary embodiment, an "elapsed time" may be used as a trigger. For example, the first lottery may be performed again when 24 hours has elapsed since the previous first lottery was performed. Alternatively, the first lottery may be performed when a predetermined time period has elapsed since all the exhibited cookies were sold out. Other than such a condition relevant to time period/time point, a matter irrelevant to time may be used as a trigger for performing the first lottery. For example, a predetermined timing based on a user's operation may be used as a trigger. In this case, a button for "updating" the exhibition content may be presented to the user, and the first lottery may be executed when this button is tapped. Besides, for example, the following facts may be used as a trigger for performing the first lottery: a user logs in; a user's level rises; a predetermined parameter such as "friendship" reaches a predetermined value; and a friend is invited.

Also for the second lottery, the timing thereof is not limited to the above example. For example, the "cookie" may be treated as an object or an item that can be carried. Further, in this case, a purchased "cookie" may be given to another user. Then, the second lottery processing may be performed at a timing at which the user "uses" the purchased cookie. Alternatively, while, also here, the "cookie" is treated as an object or an item that can be carried, the second lottery may be performed in advance at the time of purchasing the cookie. In this case, the same result is obtained no matter when the "cookie" is used.

In the above exemplary embodiment, in the first lottery, the cookie appearance database 504 and the rareness degree database 505 in which the appearance rates are defined, i.e., a lottery table is used. In another exemplary embodiment, any lottery method may be used without using such a lottery table. For example, the appearance order of "cookies" may be determined for each user, and "cookies" may be exhibited in accordance with the order. Alternatively, for example, "cookies" to be exhibited may be determined in accordance with the time at which the first lottery is executed. Still alternatively, for example, the appearance rates may be equalized so as to perform random selection. Also for the second lottery, any lottery method may be used.

In the above example, the case where one piece of furniture is acquired with one "cookie" has been shown. However, without limitation thereto, plural pieces of furniture may be acquired with one "cookie".

The content targeted for the second lottery is not limited to the in-game content such as the furniture. For example, the above processing may be applied to a "coupon application", and a "coupon" may be used as content targeted for the second lottery. Other than this, the target content may be an image file, a movie file, a music file, or the like that can be used within the application or outside the application.

As "presentation elements" associated with a plurality of content groups that are lottery targets, "cookies" are used in the above example. However, any "presentation elements" may be used as long as each presentation element is associated with a plurality of contents as a group. For example, a virtual product other than "cookie", or an O-mikuji image, a virtual housing, or the like may be presented as a "presentation element" to the user.

The "virtual currencies" are not limited to the "bell" and the "ticket" as described above. For example, an object such as "orb" or "jewel" that is not treated as currency in the real world may be treated as virtual currency.

In the above example, "cookies" are presented to a user by being exhibited at a virtual shop. However, the presentation method is not limited thereto. Any method that provides visual presentation using an image other than a shop may be used. Further, an auditory presentation method using a loudspeaker or the like may be employed.

When a "cookie" is purchased using the "ticket", a predetermined reward may be provided to the user. For example, a so-called "point card" may be set and a predetermined number of points may be provided when a "cookie" is purchased using the "ticket". Then, when the points reach a predetermined amount, the user may be allowed to exchange the points for a "cookie" or a piece of furniture that the user desires. Besides, when a "cookie" is purchased using the "ticket", a predetermined event may be presented to the user. For example, an event movie associated with content drawn by a lottery based on the "cookie" purchased with the ticket, or a story relevant to the content, may be presented to the user. In this case, such a reward may not be provided when a purchase is performed using "bells". This can provide a motivation for purchase using a "ticket".

What is claimed is:

1. An information processing system comprising:
   electronic storage configured to store data for different pieces of virtual game content that are usable by a user within a video game that includes a virtual game world, where each piece of virtual game content is included in one of a plurality of content groups, where each of the plurality of content groups is associated with a corresponding appearance rate, where each corresponding appearance rate is stored as a degree of rarity of the corresponding content group;
   at least one computer configured to:
     execute the video game that is programmed to accept input from a user to use different ones of the different pieces of virtual game content within the video game;
     automatically perform a first draw process at a predetermined timing to select, based on the corresponding appearance rates that are stored in association with the plurality of content groups, at least one of the plurality of content groups;
     for each of the at least one of the plurality of content groups that are selected, output, for display, a presentation element that corresponds to one of the plurality of content groups;

accept a selection input provided by the user to specify one of the presentation elements that have been output for display;

based on the selection input to specify one of the presentation elements, perform a second draw process to select, based on corresponding appearance rates that are associated with each piece of virtual game content within the content group associated with the specified presentation element, at least one piece of virtual game content from within the content group associated with the specified presentation element; and set the at least one piece of virtual game content to be useable by the user within the video game.

2. The information processing system according to claim 1, wherein the first draw process is repeatedly performed at predetermined time intervals without user input.

3. The information processing system according to claim 1, wherein the first draw process is performed every time the predetermined timing comes.

4. The information processing system according to claim 1, wherein the second draw process is performed when a first virtual currency associated with the user is spent in accordance with an instruction provided by the user.

5. The information processing system according to claim 4, wherein
irrespective of whether or not the first virtual currency is used, the first draw process is performed to select the at least one of the plurality of content groups and the corresponding presentation elements are output.

6. The information processing system according to claim 4, wherein the at least one computer is further configured to:
concurrently present, to the display screen along with the presentations elements, a second presentation element which is set in advance irrespective of the first draw process; and
based on a spending instruction for a second virtual currency, perform another instance of the second draw process to select at least one virtual game content from within the content group associated with the second presentation element,
wherein performance of the second draw process is additionally based on a first spending instruction for the first virtual currency.

7. The information processing system according to claim 6, wherein the at least one computer is further configured to provide a reward to the user based on performance of the second draw process.

8. The information processing system according to claim 6, wherein the at least one computer is further configured to provide the first virtual currency to the user in exchange for the virtual game content.

9. The information processing system according to claim 6, wherein the first draw process includes selecting at least one presentation element from a plurality of the second presentation elements is performed.

10. The information processing system according to claim 6, wherein the presentation elements are presented to the user irrespective of whether or not any virtual currency is spent.

11. The information processing system according to claim 6, wherein the at least one computer is further configured to:
based on determination that the second draw process has been performed a predetermined number of times by using the first virtual currency in accordance with an instruction provided by the user, restrict processing of the second draw process or processing of setting virtual game content as usable with the virtual game world.

12. The information processing system according to claim 1, wherein the at least one computer is further configured to:
track a number of times that the second draw process has been performed; and
based on determination that the tracked number of times exceeds a threshold, restrict performance of the second draw process at least until a threshold timing is satisfied.

13. The information processing system according to claim 12, wherein the at least one computer is further configured to:
determine that the draw process has been performed with respect to a predetermined presentation element and based on the determination restrict, until the threshold timing, processing of the second draw process or setting the at least one piece of virtual game content to be useable by the user within the virtual game world.

14. The information processing system according to claim 1, wherein each one of the plurality of content groups are composed of different sets of virtual game content.

15. The information processing system according to claim 1, wherein the first draw process includes performing a separate draw process for each of the at least one of the plurality of content groups that are selected.

16. The information processing system according to claim 1, wherein the at least one computer is further configured to present, to the user, a virtual object associated with the presentation element selected in accordance with the first draw process.

17. The information processing system according to claim 1, wherein all of the presentation elements associated with the at least two of the plurality of content groups are concurrently displayed to the user on the display screen.

18. The information processing system according to claim 1, wherein the different pieces of virtual game content include characters, units, items, and/or abilities that are useable within the virtual game world of a video game.

19. An information processing method executed by a computer of an information processing system for providing content used in an application to a user, the method comprising:
storing data for different pieces of virtual game content that are usable by a user within a video game, where each piece of virtual game content is included in one of a plurality of content groups, where each of the plurality of content groups is associated with a corresponding appearance rate, where each corresponding appearance rate is stored as a degree of rarity of the corresponding content group;
executing the video game that is programmed to accept input from a user to use different ones of the different pieces of virtual game content within the video game;
automatically performing a first draw process at a predetermined timing to select, based on the corresponding appearance rates that are stored to be associated with the plurality of content groups, at least one of the plurality of content groups;
for each of the at least one of the plurality of content groups that are selected, presenting a presentation element to a display screen, where each presented presentation element that is presented is visually different from other presented presentation elements;
based on an input provided by the user to specify one of the presented presentation elements that have been presented to the display screen, performing a second draw process to select, based on corresponding appearance rates that are associated with each piece of virtual game content within the content group associated with the specified presentation element, at least one piece of virtual game content from within the content group associated with the specified presentation element; and setting the at least one piece of virtual game content to be useable by the user within the video game.

20. A computer-readable non-transitory storage medium having stored therein an information processing program to be executed by a computer of an information processing system for providing content used in an application to a user, the information processing program comprising instructions that cause the computer to perform operations comprising:

storing data for different pieces of virtual game content that are usable by a user within a video game that includes a virtual game world, where each piece of virtual game content is included in one of a plurality of content groups, where each of the plurality of content groups is associated with a corresponding appearance rate, where each corresponding appearance rate is stored as a degree of rarity of the corresponding content group;

executing the video game that is programmed to accept input from a user to use different ones of the different pieces of virtual game content within the video game;

automatically performing a first draw process at a predetermined timing to select, based on the corresponding appearance rates that are stored in association with the plurality of content groups, at least one of the plurality of content groups, wherein the first draw process includes performing a separate draw process for each of the at least one of the plurality of content groups that are selected;

presenting, to a display screen, a presentation element for each content group that is selected, where each presented presentation element is visually different from other presented presentation elements;

based on an input provided by the user to specify one of the presented presentation elements, performing a second draw process to select, based on corresponding appearance rates that are associated with each piece of virtual game content within the content group associated with the specified presentation element, at least one piece of virtual game content from within the content group associated with the specified presentation element; and setting the at least one piece of virtual game content to be useable by the user within the video game.

21. An information processing apparatus comprising:

at least one computer that stores computer executable instructions that are configured to cause the at least one computer to perform operations comprising:

storing, to electronic memory of the computer, data for a plurality of virtual items that are usable by a user within a video game that includes a virtual game world, where each one of the plurality of virtual items is included in one of a plurality of item groups, where each of the plurality of item groups is associated with a corresponding appearance rate, where each corresponding appearance rate is stored as a degree of rarity for a respective one of the plurality of item groups;

executing the video game that is programmed to accept input from a user to use different ones of the plurality of virtual items within the video game;

automatically performing a first draw process at a predetermined timing to select, based on the corresponding appearance rates that are stored in connection with the plurality of item groups, at least one of the plurality of item groups, wherein the first draw process includes performing a separate draw process for each of the at least one of the plurality of item groups that are selected;

presenting, to a display screen, a presentation element for each item group that has been selected, where each presented presentation element is visually different from other presented presentation elements;

based on an input provided by the user to specify one of the presentation element(s) that has been presented to the display screen, performing a second draw process to select, based on corresponding appearance rates that are associated with each virtual item within the item group associated with the specified presentation element, at least one item from within the item group associated with the specified presentation element; and unlocking, for use within the video game by the user, the at least one virtual item.

22. The information processing system according to claim 1, wherein the at least one of the plurality of content groups that is selected from the performed first draw process is at least two of the plurality of content groups.

* * * * *